United States Patent [19]
Brokke

[11] B 3,914,251
[45] Oct. 21, 1975

[54] CERTAIN TRIFLUOROBUTENYL COMPOUNDS AND THEIR UTILITY AS NEMATOCIDES

[75] Inventor: Mervin E. Brokke, Moraga, Calif.

[73] Assignee: Stauffer Chemical Company, Westport, Conn.

[22] Filed: Apr. 27, 1973

[21] Appl. No.: 354,979

[44] Published under the Trial Voluntary Protest Program on January 28, 1975 as document no. B 354,979.

Related U.S. Application Data

[62] Division of Ser. Nos. 208,032, Dec. 8, 1971, Pat. No. 3,780,050, and Ser. No. 877,538, Nov. 20, 1969, Pat. No. 3,697,536, which is a division of Ser. No. 490,664, Sept. 27, 1965, Pat. No. 3,513,172.

[52] U.S. Cl............... 260/326 NS; 260/326 HL

[51] Int. Cl.[2]...................................... C07D 209/48
[58] Field of Search ................ 260/326 NS, 326 HZ

[56] References Cited
UNITED STATES PATENTS
2,613,221    10/1972    Ladd............................ 260/326 NS

*Primary Examiner*—Donald G. Daus
*Assistant Examiner*—Mark L. Berch
*Attorney, Agent, or Firm*—Harry A. Pacini

[57] ABSTRACT

Compounds of the formula $$CF_2=CFCH_2CH_2-R$$

in which R is a member selected from the group consisting of 2-thiabenzoxazoyl, 2-thiobenzothiazolyl, phthalimido, and N-thiazolidyl dione. The compounds are useful as nematocides.

1 Claim, No Drawings

CERTAIN TRIFLUOROBUTENYL COMPOUNDS AND THEIR UTILITY AS NEMATOCIDES

This is a division of application Ser. No. 208,032 filed Dec. 8, 1971 now U.S. Pat. No. 3,780,050.

This application is a division of copending application Ser. No. 877,538, filed Nov. 20, 1969 U.S. Pat. No. 3,697,536, which in turn is a divisional application of Ser. No. 490,664, filed Sept. 27, 1965, now U.S. Pat. No. 3,513,172, issued May 19, 1970.

This invention relates to certain new and novel chemical compounds and to the utility of said compounds as effective nematocides. More specifically, this invention relates to compounds of the general formula $$CF_2=CFCH_2CH_2-R$$

wherein R is a member selected from the group consisting of chlorothiophenyl, thio-3,4,4-trifluoro-3-butenyl, 2-thio-4,4,6-trimethyldihydropyrimidyl, 2-thiobenzoxazoyl, 2-thiobenzothiazolyl, 2-thio-4-alkylthiazolyl, S-(3,4,4-trifluoro-3-butenyl)-ethylene-bis(dithiocarbamoyl), thiobenzyl, thionaphthyl, phthalimido, dithio-3,4,4-trifluoro-3-butenyl-thiopyridyl, N-thiazolidyl di-one, and 5-thio-3-phenyl-1,2,4-thiadiazolyl.

The compounds herein contemplated can be prepared by various methods. One such general method of preparing the compound with bonding by means of a thio group is the condensation of the appropriate thiol (R—SH) and 3,4,4-trifluoro-3-butenyl bromide, usually in the presence of an organic base, such as triethylamine. Similarly, compounds wherein bonding is through a heterocyclic nitrogen condensation is accomplished using the appropriate sodium or potassium salt of the heterocyclic nitrogen containing compound and 3,4,4-trifluoro-3-butenyl bromide. The reactions proceed readily in the liquid phase. The employment of an inert organic solvent is also useful, facilitating processing as well as agitation of the reactants. Temperatures that permit operation in the liquid phase and which are between room temperature and reflux temperature of the solvent, if one is used, are employed. Preferably the reaction mixture is refluxed, usually at an elevated temperature.

It has been found that the compounds of the present invention are particularly effective as nematodes. They are effective in the control of namatodes when applied to a nematodal habitat.

The compounds of the present invention may be prepared in accordance with the following illustrative examples.

EXAMPLE 1

Preparation of p-chlorophenyl 3,4,4-trifluoro-3-butenyl sulfide.

In 200 ml. methanol was dissolved 14.4 g. of p-chlorothiophenol. To this solution was added 25 g. of 25 percent sodium methoxide followed by 18.9 g. of 3,4,4-trifluoro-1-bromobutene-3. The resulting mixture was stirred and heated under reflux for 1 hour. The solvent was removed in vacuo. The residue was taken up in benzene, washed with water and dried over anhydrous magnesium sulfate. The benzene was evaporated. There was obtained 19.3 g. of the title compound, $n_D^{30} = 1.5360$.

EXAMPLE 2

Preparation of Bis(3,4,4-trifluoro-3-butenyl) ethylene-bis(dithiocarbamate).

Ethylene diamine (0.2 moles) and triethylamine (0.2 moles) were dissolved in 100 ml. of dioxane. Carbon disulfide (0.2 moles) was added dropwise with stirring at 10°–20°C. Stirred at room temperature for 15 minutes after addition was completed, then heated to 40°C. for 15 minutes. To the reaction mixture was added 0.15 mole (28.4 g.) of 3,4,4-trifluoro-3-butenyl bromide. This was heated to 60°C. for 2 hours. The reaction mixture was poured into water and extracted with benzene. The benzene solution was subsequently washed with water, dried over anhydrous calcium chloride and finally the benzene removed in vacuo. There was obtained 77.4 g. of the title compound, $n_D^{30} = 1.5292$.

EXAMPLE 3

Preparation of 3-Phenyl-5-(3,4,4-trifluoro-3-butenyl thia)-1,2,4-thiadiazole.

3-Phenyl-1,2,4-thiadiazole thiol-5, 6.6 g., were mixed with 9.5 g. of 3,4,4-trifluoro-3-butenyl bromide in 150 cc. of dioxane as a solvent with 10.1 g. of triethylamine as the catalyst. The reaction mixture was refluxed for 2½ hours. Isolation of the title compound was in the same manner as in Example 2. There was obtained 8.8 g. of a dark oil, $n_D^{30} = 1.5687$.

EXAMPLE 4

Preparation of N-(3,4,4-trifluoro-3-butenyl) 2,4-thiazolidenedione.

In 100 ml. of methanol there was dissolved 11.7 g. of 2,4-thiazolidinedione. This was treated with 0.1 mole of sodium methoxide in methanol. To this solution was added 18.9 g. of 3,4,4-trifluoro-3-butenyl bromide. The resulting mixture was refluxed for 2 hours. The solvent was then evaporated and the residue was taken up in benzene. The benzene solution was washed with water, dried over anhydrous calcium chloride, and the solvent evaporated. There was obtained 7.2 g. of the title compound, $n_D^{30} = 1.4578$. Analysis of the infrared spectrum supported the proposed structure.

As previously mentioned, the herein described novel compositions produced in the above described manner are biologically active compounds which are useful and valuable in the control of various organisms. The compounds of the invention were tested as nematocides in the following manner.

Nematocide Evaluation Test. This test determines a candidates action on root-knot nematodes (Meloidogyne, sp.) in soil. One-pound portions of soil infected with root-knot nematodes were placed in quart jars. The chemical to be tested was pipetted into the nematode-infested soil at various dilutions of from 55 to 1 part per million (ppm) or until activity was lost. After mixing the candidate compound into the soil, the soil was sealed for 48 hours. The treated soil was then placed in paper containers and allowed to stand in a greenhouse one week for airing. At the end of this time a tomato plant was transplanted into the soil. The root-knot nematodes attack the tomato plant roots if they survived the chemical treatment, and cause swelling or knots on the roots. Four weeks after treatment, the plant was removed from the soil and the roots inspected. The lowest concentration which prevented nematode development was recorded.

The following table is a listing of the compounds prepared according to the aforedescribed procedures. Column II is the results obtained from the nematocide evaluation test. The values given in Column II are concentrations (ppm) which allowed no nematode development.

TABLE

| COMPOUND | Column I<br>$n_D^{30}$ | Column II<br>Nematode<br>Control (ppm) |
|---|---|---|
| p-chlorophenyl 3,4,4-trifluoro-3-butenyl sulfide | 1.5360 | 50 |
| bis(3,4,4-trifluoro-3-butenyl) sulfide | 1.4087 | 2.5 |
| 2-(3,4,4-trifluoro-3-butenylthio)-4,4,6-trimethyldihydropyrimidine | 1.4949 | 25 |
| 2-(3,4,4-trifluoro-3-butenylthio)-benzoxazole | 1.5385 | (2.5) |
| 2-(3,4,4-trifluoro-3-butenylthio)-benzothiazole | 1.5863 | (2.5) |
| 2(3,4,4-trifluoro-3-butenyl-thio-4-methylthiazole | 1.5358 | (1) |
| bis(3,4,4-trifluoro-3-butenyl) ethylene-bis(dithiocarbamate) | 1.5292 | (10) |
| phenyl 3,4,4-trifluoro-3-butenyl sulfide | 1.5442 | 50 |
| 3-phenyl-5-(3,4,4-trifluoro-3-butenyl-thia)-1,2,4-thiadiazole | 1.5687 | (2.5) |
| 3,4,4-trifluoro-3-butenyl benzyl sulfide | 1.5120 | 25 |
| 3,4,4-trifluoro-3-butenyl α-naphthyl sulfide | 1.5805 | (50) |
| N-(3,4,4-trifluoro-3-butenyl)phthalimide | (semi-solid) | (2.5) |
| bis(3,4,4-trifluoro-3-butenyl) disulfide | (liquid) | (2.5) |
| 2-(3,4,4-trifluoro-3-butenylthio)-pyridine | 1.5258 | 25 |
| 4-(3,4,4-trifluoro-3-butenylthio)-pyridine | 1.5471 | (2.5) |
| N-(3,4,4-trifluoro-3-butenyl) 2,4-thiazolidenedione | 1.4678 | (1) |
| ( ) = partial control | | |

The compounds of the present invention may be used as effective nematocides and may be applied in a variety of ways at various concentrations. In practice, the compounds are usually formulated with an inert nematocidal adjuvant, utilizing methods well-known to those skilled in the art, thereby making them suitable for application as dusts, sprays, or drenches. The amount applied will depend upon the nature of the nematode to be controlled and the rate of application may vary from 1 to 50 pounds per acre. One particularly advantageous way of applying the nematocidal composition comprising the adjuvant and an effective amount of a compound of the present invention is as a spray, drench or dust followed by incorporation.

Various changes and modifications may be made without departing from the spirit and scope of the invention described herein as will be apparent to those skilled in the art to which it pertains. It is accordingly intended that the present invention shall only be limited by the scope of the appended claim.

What is claimed is:

1. The compound N-(3,4,4-trifluoro-3-butenyl) phthalimide.

* * * * *